Patented Oct. 14, 1941

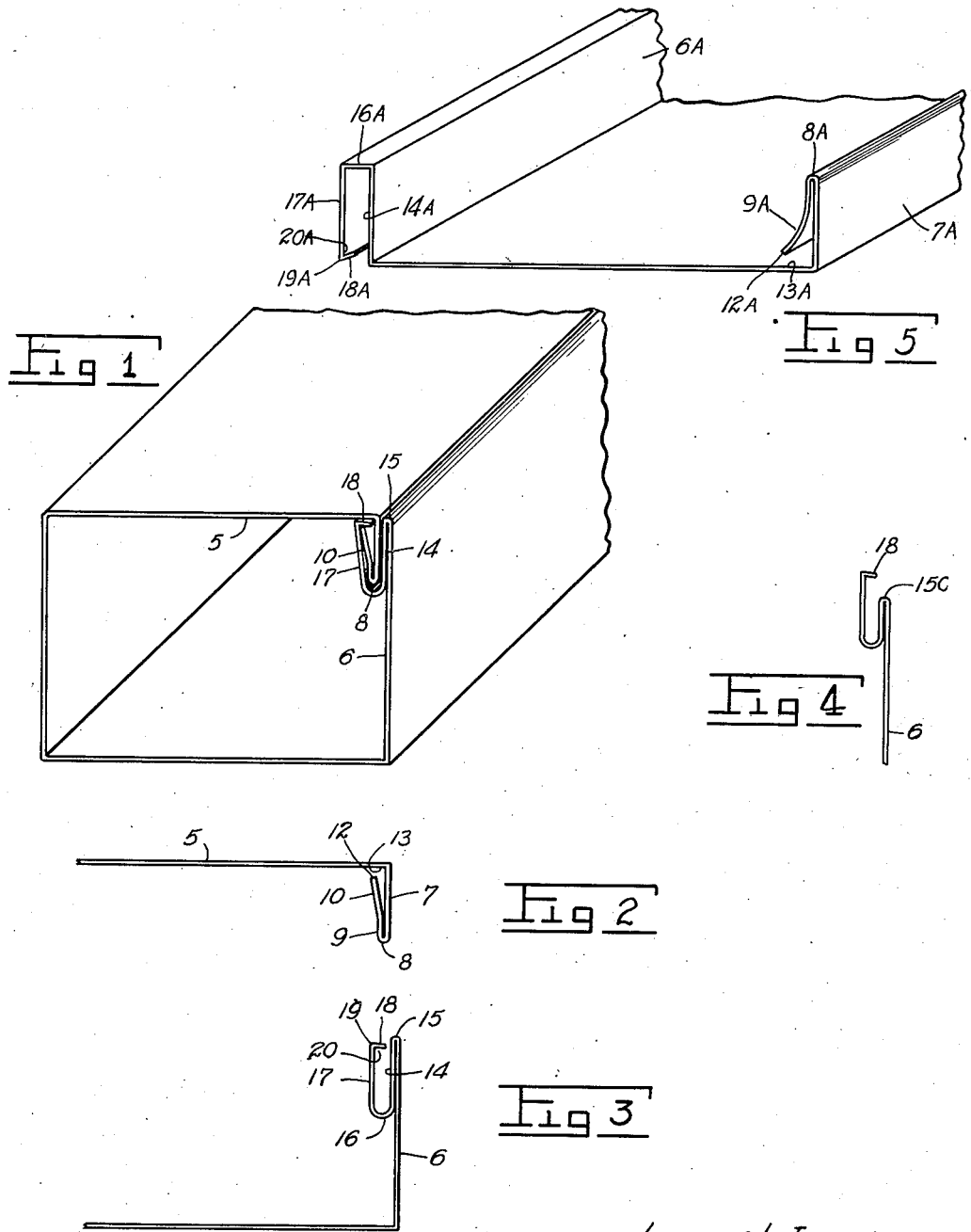

2,259,382

UNITED STATES PATENT OFFICE 2,259,382

CORNER SNAP LOCK

James J. Ingels, Chicago, Ill., assignor of one-half to The Cincinnati Sheet Metal and Roofing Company, Cincinnati, Ohio, a corporation of Ohio Application October 14, 1940, Serial No. 361,081

8 Claims. (Cl. 108—13)

This invention relates to a corner snap lock, the purpose of which is to furnish a substantial quick-assembly joint along the meeting line or juncture of two panels or sheets of metal or similar material.

An object of the invention is to provide a simple and effective snap action lock which is particularly applicable to corner joints in angular sheet metal structures wherein separation and collapse of the joint are to be guarded against.

Another object of the invention is to provide a corner snap lock of a type which may be machine-made in its entirety, and produced in large quantities at minimum expense due to the use of rolls or dies which are durable and simple of design.

Another object of the invention is to produce a corner snap lock which is substantially free of play or looseness, so that the joint formed thereby will definitely establish the relationship to one another of any two parts to be fitted together for structural purposes.

Another object is to provide a joint of the character stated, which will not be susceptible to accidental separation under conditions of vibration or rough usage, and which may be assembled at the factory or on the job with equal facility.

The foregoing and other objects are attained by the means described herein and disclosed in the accompanying drawing, in which—

Fig. 1 is a perspective view of an article incorporating the corner snap lock of the present invention.

Fig. 2 is an end view of the plug section of the corner snap lock.

Fig. 3 is an end view of the socket section of the corner snap lock.

Fig. 4 is an end view of a modified form of socket section.

Fig. 5 illustrates the invention applied to roofing.

As it would be impracticable herein to illustrate and describe the numerous applications of the invention, there has been illustrated in the drawing, merely for the purpose of explanation and disclosure, a casing, duct, pipe or other hollow article which will serve as a foundation for the complete exemplification for the invention. In considering the disclosure herein, it should be observed that the casing or enclosure illustrated by the drawing might be the hollow leg of a desk, table, or other piece of furniture, as well as any other structure to be assembled from panels or sheets of metal or like material. Various applications of the invention will become manifested as the description proceeds.

In the drawing, the character 5 indicates broadly a sheet or panel of material, preferably metal or the like, and 6 indicates a sheet or panel to be joined to the first sheet or panel 5. As is most clearly illustrated by Figs. 2 and 3, the first sheet 5 incorporates an angularly turned edge which constitutes a plug section, this being receivable in a socket section provided upon the sheet or panel 6. The construction of the plug section and socket section is such that when the plug section is inserted into the socket section, the parts will permanently lock together with a snap action, and moreover, by reason of an ingenious proportioning of cooperative parts of the plug and socket sections there is eliminated practically all play or looseness so that the joint formed thereby will definitely establish a fixed relationship of the sheets or panels to one another. By reason of this construction, there can be no relative movement and resultant frictional chafing of the parts such as would permit rattle or vibration, or the destruction of a film of paint or other coating material that may be applied over and about the line of juncture of the sheets.

The plug section of sheet 5 comprises a flange 7 which may be bent substantially at right angles or at any other angle to this sheet, and this flange is turned upon itself at the nose 8 of the plug section, to furnish a leg 9 resting in close proximity to the inner fact of flange 7. The marginal portion of leg 9 may be bent away from the flange 7 as at 10, so as to provide a free edge or abutment 12 which is spaced from flange 7 and also from the inner or adjacent surface of sheet 5. The character 13 indicates an inner abutment surface or seat on the sheet 5, located directly above the free edge 12 of the plug section, for a purpose to be hereinafter explained. At this point it may be said that portions 9 and 10 may be planar, if desired, but divergent from the nose portion 8 of the flange.

The socket section of sheet 6 may consist of a reversely turned portion of the sheet, indicated by the character 14 and constituting a face abutting leg. Where the leg 14 attaches to sheet 6, there is formed a double-thickness exterior edge 15. The face abutting leg 14 is turned upon itself at the location 16 to provide a channel or spanning portion, and the marginal portion of the inwardly turned leg 14 is turned upwardly from the span 16 to provide a resilient leg 17 which is complementary to the face abutting leg 14. At the free edge of the resilient leg 17 the material is turned inwardly toward leg 14, and directed into the socket between legs 14 and 17, to provide a hook flange 18. The hook flange meets leg 17 at an apex indicated at 19. The legs 14 and 17 are to be spaced apart and may be either in substantial parallelism, or in a slightly divergent relationship to one another so as to provide a mouth for the socket section located between the hook flange 18 and the exterior edge 15.

To join the sheets 5 and 6 of Figs. 2 and 3, so as to produce the connection illustrated by Fig. 1, it is necessary only to insert the nose 8 of the plug section into the space between the parts 15 and 18 of sheet 6, and then advance the plug section into the socket section until the apex 19 strikes the inner abutment surface or seat 13 of the plug section, whereupon the free edge 12 of the plug section will snap past the hook flange 18 and seat itself within the groove 20 formed at the angle between hook flange 18 and resilient leg 17. The length of the hook flange and the space between the free edge 12 and the adjacent seat 13 of the plug section, are so coordinated that said apex 19 will always rest upon or so close to the seat 13, that any advanced movement of the plug into the socket beyond that which is necessary for effecting the lock, is effectively prevented. Withdrawal of the plug section, of course, is positively limited and precluded by the engagement of its free edge 12 within the groove or angle 20. From the foregoing it will be understood that the space between the apex 19 of the hook flange, and the elevation of the lowest part of the hook flange, will be but slightly less than the space between the free edge 12 of the plug section and its cooperative seat portion or abutment 13. The elevation of the double-thickness exterior edge 15 preferably is above that of the apex 19, to the extent necessary for disposing edge 15 in substantially the plane of sheet 5 (Fig. 1), in the assembled condition of the structure. This difference in elevation conveniently may approximate the thickness of sheet 5. Fig. 4, however, shows said double-thickness exterior edge at a lower elevation, this being a possible modification which will be operative in association with the plug section of Fig. 2. Except for the disposition of edge 150 below the plane of a sheet such as 5, the modified structure of Fig. 4 will cooperate with a plug section in the manner heretofore explained in connection with Fig. 2. Alternatively, the double-thickness edge 150 may be in some instances elevated considerably above the hook flange 18, provided that it is considered desirable to accentuate the junction line of the lock joint.

Fig. 5 illustrates a roof covering made from metallic sheet material, and its various parts that correspond to the parts or elements described in connection with Figs. 1, 2 and 3, are indicated by like reference characters with the suffix A added. When a socket section such as is shown at the left of Fig. 5 is placed over a plug section like that at the right of the figure, the leg 9A will be cramped within the confines of the socket section with its free edge 12A resting within the groove 20A. The nose 8A of the plug section will substantially abut the part 16A of the socket section, while apex 19A will substantially contact the seat 13A of the plug section. The roofing sheet may be nailed, clamped or otherwise fixed to the roof, preferably in the region of the plug section. Any number of sheets may be laid progressively along the roof area, with corresponding plug and socket sections locked together in substantially the manner heretofore explained.

While the presumption throughout this description is that the sheets and their lock joints are constructed from sheet metal by preference, it is to be understood that the same may be formed from other forms of resilient sheet material such as cellulosic sheeting, plastic, and fibrous board material of various types. Other modifications and changes in materials and in the structural details may be made, within the scope of the appended claims without departing from the spirit of the invention.

What is claimed is:

1. A sheet metal assembly which comprises in combination, a sheet of resilient material having a margin thereof turned at an angle to provide a flange and an interior seat adjacent to the flange, a leg on the flange turned into substantial parallelism with the flange and directed toward said seat, the leg including a marginal portion turned away slightly from the flange, said marginal portion having a free edge facing the interior seat aforesaid, a second sheet of resilient material turned upon itself to provide a double-thickness exterior edge and a face abutting leg extending away from said edge, said face abutting leg including a marginal portion turned upon said leg to provide a complementary resilient leg spaced from the face abutting leg to furnish a socket for reception of the flange, the leg, and the free edge of the marginal portion of the first sheet of resilient material, and a hook flange on said complementary resilient leg of the second sheet turned at an acute angle toward the face abutting leg and into the socket, the acute angled portion providing a seat for reception of the free edge of the first sheet, said hook flange having an apex to engage the interior seat of the first sheet for limiting the extent to which the flange and leg parts of the first sheet may enter the socket of the second sheet, withdrawal of said parts from the socket being barred by the free edge of the leg of the first sheet engaging within the acute angle portion of the hook flange of the second sheet.

2. A sheet metal assembly which comprises in combination, a sheet of resilient material having a margin thereof turned at an angle to provide a flange and an interior seat adjacent to the flange, said flange being turned upon itself to provide a divergent leg directed toward said seat, said leg having a free edge facing said interior seat, a second sheet of resilient material turned upon itself to provide a double-thickness exterior edge and a sheet-abutting leg extending away from said edge, said sheet-abutting leg including a marginal portion turned upon said leg to provide a complementary resilient leg spaced from the sheet-abutting leg to furnish a socket for reception of the flange, the leg, and the free edge of the marginal portion of the first sheet of resilient material, and a hook flange on said complementary resilient leg of the second sheet turned at an angle toward the sheet-abutting leg and into the socket, the angle providing two seats for reception of the free edge of the first sheet barring withdrawal of said parts from the socket and the other contacting the interior seat of the sheet first mentioned, to limit entry of the leg of said first mentioned sheet into the socket of the second sheet.

3. A sheet metal assembly which comprises in combination, a sheet of resilient material having a margin thereof turned at an angle to provide a flange and an interior seat adjacent to the flange, said flange being turned upon itself to provide a divergent leg directed toward said seat, said leg having a free edge facing said interior seat, a second sheet of resilient material turned upon itself to provide a double-thickness exterior edge and a sheet-abutting leg including a marginal portion turned upon said leg to provide a complementary resilient leg spaced from the sheet-abutting leg to furnish a socket for reception of the flange, the leg, and the free edge of the margin of the first sheet of resilient material, and a hook flange on said complementary resilient leg of the second sheet turned at an angle toward the sheet abutting leg and into the socket, the angle providing a seat for reception of the free edge of the first sheet, said hook flange having an apex to engage the interior seat of the first sheet for limiting the extent to which the flange and leg parts of the first sheet may enter the socket of the second sheet, withdrawal of said parts from the socket being barred by the free edge of the leg of the first sheet engaging within the angle portion of the hook flange of the second sheet.

4. A sheet metal assembly of the class described, comprising a first sheet and a second sheet, a linear plug section on the first sheet comprising a sheet margin turned at an angle to provide a flange and an interior seat adjacent to the flange, a leg on the flange turned into substantial parallelism with the flange and directed toward and into close proximity with said seat, falling short of contact with said seat by a distance slightly greater than the sheet thickness, the leg including a marginal portion turned away slightly from the flange, said marginal portion having a free edge facing the interior seat aforesaid, said second sheet of resilient material being turned upon itself to provide a pair of complementary resilient legs spaced apart to furnish a socket for reception of the linear plug section of the first sheet, and a hook flange on one of said resilient legs of the second sheet turned at any angle into the socket, the angle portion providing a seat for reception of the free edge of the first sheet, said hook flange having an apex to engage the interior seat of the first sheet for limiting the extent to which the flange and leg parts of the first sheet may enter the socket of the second sheet, withdrawal of said parts from the socket being barred by the free edge of the leg of the first sheet engaging within the angle portion of the hook flange of the second sheet.

5. A sheet metal assembly comprising two sheets of metal disposed substantially at right angles to one another, the first of said sheets comprising a linear plug section composed of a marginal portion of the sheet turned substantially at right angles to said sheet to provide a flange, and including a leg on the flange directed backwardly to approach the body of the sheet at a wide angle, and having a terminal edge falling short of contacting the body of said sheet by a distance slightly greater than the sheet thickness, the second sheet including an elongated socket section extending along and in substantial parallelism with the plane of said second sheet, and having a mouth opening near an edge of the sheet into which the angularly disposed plug section of the first sheet may be introduced, and means at the socket section cooperating with the backwardly directed leg of the plug section to preclude withdrawal of the plug section subsequently to insertion thereof into the socket section, said means being snugly received between the terminal edge of the leg of the first sheet and the adjacent body portion of said sheet.

6. A sheet metal assembly comprising two panels disposed substantially at right angles to one another, the first of said panels including a linear plug section comprising a nose and a locking flange, with the locking flange directed toward the body of the panel at an angle slightly greater than a right angle, the second panel including an elongated socket section extending along and in substantial parallelism with the plane of said second panel, the socket section having a mouth opening near an edge of said panel, whereby introduction of the plug section of the first panel into the socket section of the second panel is performed by moving the sheets at right angles toward one another, and cooperative inturned flange means carried by the socket section for retaining the locking flange of the plug section subsequently to insertion of the latter, the locking flange of the plug section holding the inturned flange of the second sheet substantially in contact with the body of the first sheet, to limit insertion of the plug section into the socket section.

7. A sheet metal structure comprising a substantially flat panel having opposed marginal portions and an intermediate body portion, one of said marginal portions being bent to form a leg upstanding at right angles to the body portion, and turned downwardly upon itself to provide a plug including a nose and a terminal inner edge spaced from the right angular leg, said terminal inner edge being disposed in close proximity with the body portion but spaced therefrom a distance slightly greater than the thickness of the metal sheet, the other marginal portion of the panel being bent upwardly, outwardly, and downwardly to furnish a substantially inverted U-shaped socket, with the outwardly directed portion disposed at a higher elevation above the panel body than the nose of the plug, the socket thereby formed being receptive of a plug of the character recited, and a longitudinal flange on the downwardly directed portion of the socket, turned toward the body portion of the panel, to provide a ledge within the socket to receive the terminal inner edge of a plug to be associated with the socket.

8. A sheet metal structure comprising a substantially flat panel having opposed marginal portions and an intermediate body portion, one of said marginal portions being bent to form a leg upstanding at right angles to the body portion, and turned downwardly upon itself to provide a plug including a nose and a terminal inner edge spaced from the right angular leg, said terminal inner edge being disposed in close proximity with the body portion but spaced therefrom a distance slightly greater than the thickness of the metal sheet, the other marginal portion of the panel being bent upwardly, outwardly, and downwardly to furnish a substantially inverted U-shaped socket, with the outwardly directed portion disposed at a higher elevation above the panel body than the nose of the plug, the socket thereby formed being receptive of a plug of the character recited, and a longitudinal flange on the downwardly directed portion of the socket, turned toward the body portion of the panel, to provide a ledge within the socket to receive the terminal inner edge of a plug to be associated with the socket, the elevation of the ledge relative to the panel body being closely within the limits of the space provided between the panel body and the terminal inner edge of the plug portion, for preventing the nose of a plug from contacting the base of a socket portion in which the plug is inserted.

JAMES J. INGELS.

CERTIFICATE OF CORRECTION.

Patent No. 2,259,382. October 14, 1941.

JAMES J. INGELS.

It is hereby certified that error appears in the printed specification of the above numbered patent requiring correction as follows: Page 2, second column, line 57, claim 2, for the words "seats for" read --seats, one for--; page 3, first column, line 73, claim 6, for "sajd" read --said--; and that the said Letters Patent should be read with this correction therein that the same may conform to the record of the case in the Patent Office.

Signed and sealed this 9th day of December, A. D. 1941.

(Seal)
Henry Van Arsdale,
Acting Commissioner of Patents.